Patented May 26, 1931

1,806,715

UNITED STATES PATENT OFFICE

CHRISTIAN J. SCHWINDT, OF PITTSBURGH, PENNSYLVANIA, ASSIGNOR, BY MESNE ASSIGNMENTS, TO THE SELDEN RESEARCH & ENGINEERING CORPORATION, OF PITTSBURGH, PENNSYLVANIA, A CORPORATION OF DELAWARE

CRYSTALLINE ORGANIC COMPOUNDS

No Drawing.  Application filed September 27, 1930.  Serial No. 484,933.

This invention relates to improvements in crystalline organic compounds and particularly in the physical form of compounds occurring in bulky, soft crystals.

In the past, many crystalline organic compounds have presented serious problems in the packaging. This is especially true of such products as phthalic anhydride, anthraquinone and B-naphthol where bulky crystals are obtained. These bulky crystals are difficult to handle and greatly increase the container cost because of their low specific gravity. It is also difficult to remove them from containers as in many cases they will not pour. This is particularly true of phthalic anhydride where the bulky needle crystals are of extraordinary length. It is, of course, possible to melt the compounds and flake them, as is described in connection with phthalic anhydride in the co-pending application to F. A. Canon Serial No. 355,672 filed April 16, 1929. This method has also been adopted for B-naphthol. The flaked products, while dense and easily poured, present a number of serious disadvantages. In the first place, they cannot be directly prepared from the bulky crystals, the form in which most organic products can be obtained with highest purity by using fractional sublimation processes. On the contrary, it is necessary to melt the crystals and subject them to the flaking operation, which increases their cost, and the flaked product almost always shows an undesirable decoloration even when great care is exercised.

It has been proposed in the case of phthalic anhydride to grind the product, but this is very unsatisfactory because the fine dust obtained is difficult to handle. In the co-pending application of Daniels and Schwindt Serial No. 438,235 filed March 22, 1930 and the co-pending application of Daniels, Schwindt and Jaeger Serial No. 438,236 filed March 22, 1930 methods have been described for breaking the crystals of phthalic anhydride and anthraquinone to form a kind of coarse flour. This product is very satisfactory from the standpoint of pouring and high density, but, it is open to a lesser extent, to the objection that there is considerable dust formation.

The present invention avoids all of the disadvantages inherent in the various crystal forms, producing a product having the density, non-dusting and ready pouring qualities of flakes and at the same time retains the desirable color characteristics of needles and is prepared from them by an extremely cheap process.

The present invention will be described in connection with phthalic anhydride, as phthalic anhydride crystals are perhaps the most difficult to handle of all the crystalline commercial organic products. It should be understood, of course, that the invention is equally applicable to other crystalline substances such as anthraquinone, B-naphthol, benzoic acid, naphthalic anhydride, etc.

According to the present invention, the crystals, for example of phthalic anhydride, are passed between calender rolls and are felted into thin sheets which break up into large scales. The crystals are not destroyed but are merely pressed together, the flat surfaces of the scales being smoothed by the friction of the rolls which as in ordinary calender practice operate at slightly different speeds resulting in a rubbing which sufficiently consolidates the surface to hold the felted crystals in position. Although the felted products melts readily and can be handled in the same way as flakes, it is not subject to dusting. The crystals are sufficiently firmly felted together so that even when large fragments are broken up the smaller fragments obtained are far larger than ordinary dust particles and, therefore, do not present the disadvantages of dusting material.

The color of the product is the same as that of the crystals and in the case of phthalic anhydride is much lighter than is feasible with flakes as the melting operation almost invariable brings out any trace of color which may be present in the product. At the same time the procedure is extremely simple, involving merely feeding the crystals through calender rolls. The labor cost is almost negligible, and power and fuel costs are but a small fraction of that required in a flaking operation.

A further advantage lies in the fact that whenever a crystalline organic material is melted and flaked there is a certain amount of loss, whereas when crystals are felted by the process of the present invention there is practically no loss.

A further important advantage of the present invention lies in the fact that the apparatus used is kept clean, so that different grades of material can be felted without contamination. This is very important in the case of phthalic anhydride where normally two grades are produced, the pure white and a pink grade, the latter being used for many purposes where the color is unobjectionable. When the product is flaked, it is necessary to have a separate flaker for each grade of product, and if accidentally any colored material falls into a batch of high grade white material the whole batch is ruined, whereas if colored crystals accidentally fall into the machine producing the felted product no serious harm is done as the felted scales or fragments which are colored can be simply separated from the remaining product and no losses of colorless product result. An added flexibility is thus obtainable by a process which can be used successively for colorless and colored material with practically no cleaning labor as the markets for colorless and colored phthalic anhydride fluctuate. When there is but small demand for the colored material, much of this grade is repurified to colorless material. When the present invention is used it is not necessary to provide large amounts of idle equipment as calender rolls can be shifted from one product to another with only a very superficial cleaning, whereas when flaking is used it is not economical to use a flaker for more than one type of product as the cleaning labor and amount of spoiled material would make such a procedure prohibitive. The present invention, therefore, not only produces a product of superior characteristics but the product is much cheaper and hence a far greater flexibility is possible than when flaking processes are used.

The present invention is especially useful when products are sold in large quantities on a narrow margin of profit because of the reduction in power, labor and fuel costs which are possible. The present invention retains all the advantages of a high density product and renders it peculiarly important to such large tonnage products as phthalic anhydride, anthraquinone and B-naphthol, but the invention is in no sense limited to the use of these three products and includes any soft organic crystalline material.

While calender rolls, as mentioned above, are particularly suitable for continuous production of the felted product, any other suitable compacting and rubbing means can be used, for example, a single roller and a fixed surface. The results with calender rolls, however, can be obtained with a minimum of power consumption and a more reliable feed is, therefore, possible. Therefore, while this type of apparatus is not to be considered the only type for the present invention, it is preferred for large scale production because of the large economies and the large output possible.

It is sometimes desirable in the case of crystals having a high melting point to heat one or more of the rubbing surfaces. This can be achieved in the usual manner by steam heated or other types of heated rolls. In the case of phthalic anhydride and other crystals which have a low melting point the heat generated by the differential rolls is normally sufficient. It is probable that the consolidated or glazed surfaces of the product of the present invention are obtained not only by pressing but also by incipient fusion of the crystal ends, but it is by no means certain that this is the case and the invention is in no sense limited to any theory of operation. In the case of high melting crystals such as anthraquinone the heated rolls are frequently of advantage as the pressure which must be used to obtain a satisfactory product can normally be reduced. However, even with anthraquinone, cold rolls may be used wherever desired.

What is claimed as new is:

1. As a new chemical product, felted crystalline organic material having consolidated top and bottom surfaces.

2. As a new chemical product felted phthalic anhydride having consolidated top and bottom surfaces.

3. As a new chemical product, felted anthraquinone having consolidated top and bottom surfaces.

4. As a new chemical product, felted B-naphthol having consolidated top and bottom surfaces.

5. A method of felting crystalline organic material which comprises passing the material between smooth compression surfaces having sufficient relative motion with respect to each other to rub as well as compact the material passing therebetween.

6. A method of felting crystalline phthalic anhydride which comprises passing the phthalic anhydride between smooth compression surfaces having sufficient relative motion with respect to each other to rub as well as compact the phthalic anhydride passing therebetween.

7. A method of felting crystalline anthraquinone which comprises passing the anthraquinone between smooth compression surfaces having sufficient relative motion with respect to each other to rub as well as compact the anthraquinone passing therebetween.

8. A method of felting crystalline B-naphthol which comprises passing the B-naphthol between smooth compression surfaces having sufficient relative motion with respect to each other to rub as well as compact the B-naphthol passing therebetween.

9. A method according to claim 5, in which the surfaces are differential calender rolls.

10. A method according to claim 6, in which the surfaces are differential calender rolls.

11. A method according to claim 7, in which the surfaces are differential calender rolls.

12. A method according to claim 8, in which the surfaces are differential calender rolls.

Signed at Pittsburgh, Pa., this 25th day of September, 1930.

CHRISTIAN J. SCHWINDT.